A. P. Routt,
Grain Drill.
No. 93,838. Patented Aug. 17, 1869.
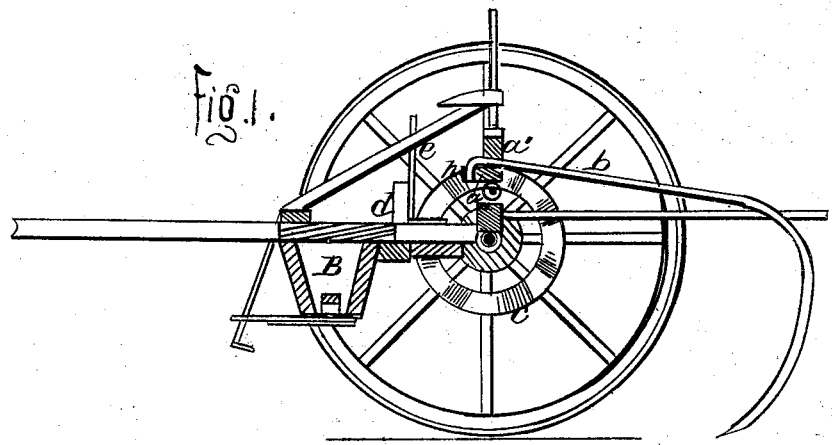
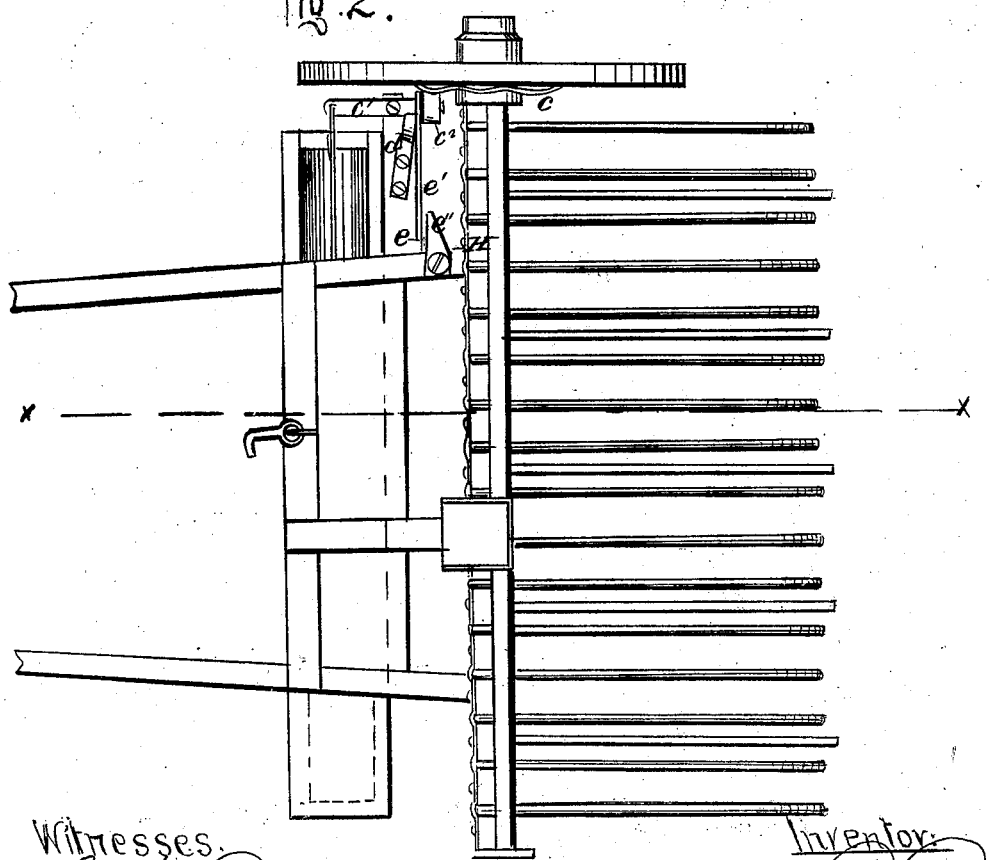

United States Patent Office.

A. P. ROUTT, OF LIBERTY MILLS, VIRGINIA.

Letters Patent No. 93,838, dated August 17, 1869.

IMPROVEMENT IN COMBINED SEEDER AND HAY-RAKE.

The Schedule referred to in these Letters Patent and making part of the same.

*To all whom it may concern:*

Be it known that I, A. P. ROUTT, of Liberty Mills, in the county of Orange, and State of Virginia, have invented a new and improved Combined Hay-Rake and Seeder; and I do hereby declare the following to be a full, clear, and exact description of the construction and operation of the same, reference being had to the accompanying drawing, forming part of this specification, in which—

Figure 1 is a longitudinal vertical section, and

Figure 2, a top view of same.

This invention consists in an improved mode of fastening the teeth of a rake, that may be used for raking hay or for scratching in seed falling from a seed-box placed in front of the rake.

Also, in an apparatus for rendering the seeder inoperative, when the machine is to be used solely as a rake.

In the drawings—

A represents the rake-head, the same consisting of two strips, $a$ $a'$, the one placed edgewise upon the other, and the two firmly bolted together.

The rake-teeth $b$ pass between the two strips, in holes made in the upper one for their reception, and are bent down over the front side of the lower strip, occupying grooves cut in said strip to receive them, and outside of the teeth a metallic band, $h$, is nailed or otherwise secured to the lower strip $a$. The teeth, by these devices, are most firmly fastened in the rake-head.

In front of the head A, and to the under side of the thills, is secured a seeder, B, consisting of the usual box, with a row of holes in the bottom, and a slide working in connection with the holes.

I design that my rake-teeth shall serve, upon occasion, to scratch in the seed.

The slide is operated by a corrugated rim, $c$, placed on the inside of the wheel, which communicates a reciprocating motion to the bar $c^1$, having on one end a friction-roller, $c^2$, following the elevations and depressions of the rim $c$, and connected at the other end to the slide in the box.

The friction-roller is kept in contact with the corrugations by means of a spring, $d$, pressing against the inside of the bar $c'$.

When I wish to render the seeder inoperative, I withdraw the bar from the corrugated rim, by means of a lever, $e$, connected, by a rod, $e'$ with the bar $c^1$, and fasten the lever behind a catch, $e''$.

Having thus described my invention,

What I claim as new, and desire to secure by Letters Patent, is—

A combined seeding-machine and horse hay-rake, substantially as described, that is to say, a machine having rake-teeth $b$ $b$, attached by means of the strips $a$ $a$ and the metallic band $h$, a seeder, B, and the distributing-apparatus, consisting of the corrugated rim $c$, spring $d$, roller $c^2$, rod $c^1$, lever $e$, and catch $e''$, when said parts are so constructed and arranged that the teeth $b$ $b$ may be used to scratch in the grain sown by the seeder, or may be used independently of the seeder-apparatus, for the purpose of raking hay.

A. P. ROUTT.

Witnesses:
JAMES ROACH,
L. L. HIGGINS.